UNITED STATES PATENT OFFICE.

CHARLES ZIMMERLING, OF PHILADELPHIA, PENNSYLVANIA.

STOVE-POLISH.

SPECIFICATION forming part of Letters Patent No. 385,335, dated June 26, 1888.

Application filed November 24, 1886. Serial No. 219,756. (Specimens.)

*To all whom it may concern:*

Be it known that I, CHARLES ZIMMERLING, a citizen of the United States, residing in the city and county of Philadelphia, State of Pennsylvania, have invented a new and useful Improvement in Stove-Polish, which improvement is fully set forth in the following specification.

Stove-polish is generally found upon the market either in hard sticks or paste form. When in the shape of sticks or rolls, it requires to be shaved or scraped to a fine powder to make it available, in doing which a great amount of dust is created. Paste polishes dry out and become hard from long keeping and exposure to the air, and are then unfit for use unless they are again softened. Plumbago in its pure state is also sometimes used; but to be available it requires to be ground to an impalpable powder, in which condition, from its extreme lightness, it floats and settles upon all surrounding objects, causing considerable difficulty in its removal. Stove-polish made in accordance with my invention is free from the above defects and possesses other advantages, such as being readily soluble to a paste or cream-like consistence, does not soil the hands, and presenting a beautiful appearance.

In carrying out the invention I take fine-powdered plumbago and combine it with some adhesive or crystalline substance, which may be soap or soap-stock (tallow, oils, and alkali) and sugar, water, clay, or their equivalents, for the purpose of absorbing and retaining all the fine dust and other extraneous matter that is in the plumbago, and also to produce the granulated form.

In the process of manufacture I generally use about ninety per cent. of plumbago with two per cent. of soap for adhesive purposes; or, in place of the soap, I may use sugar for the same purpose. When a black coloring-matter is required, I use a solution of logwood and bichromate of potash or their equivalents; but other coloring-matter may be employed, as desired. The soap or sugar is heated, with or without water, until an adhesive mass results, the same then being combined with the plumbago, producing a plastic mass. In lieu of using soap, &c., I may use soap-stock, as above, in such proportion as will produce an adhesive mass of about the same consistence as commercial soap. Soda and borax or their equivalents may also be used with very good effect, which will hasten the operation, improve the product, and render it more soluble.

In manufacturing the stove-polish the materials are preferably in a plastic condition, as they are then more easily manipulated in any granulating-machine.

If the plastic mass is not sufficiently stiff to be immediately worked, which is sometimes the case on account of too much water, it can be placed upon a floor or any suitable receptacle, when, after having lost sufficient water, it will assume, by mixing, raking, cutting, wiring, being forced through perforations, breaking, rasping, sieving, grinding, also by friction and contact, a granulated condition. If any portion is not granulated, it can be reworked until the desired result is attained. If it is desirable to keep the plastic mass a few days, I may shape it into forms or pieces which may be afterward granulated.

To make the granulated product have a more handsome and finished appearance, it is smoothed or polished in any desirable apparatus.

I do not confine myself to the precise details here mentioned, nor to the size or configuration of the product, as the shapes and forms assumed will be varied, it depending upon the time, manner, and nature of the stock manipulated, (it sometimes appearing in spherical form, and at others in needle or spiral shape, &c.) Nor do I limit myself to any mechanical appliances necessary to carry into execution the process, as I may vary the process and the proportions or their equivalents without departing from the principles of the invention, as it is evident that the invention comprehends any adhesive or crystalline materials other than the above that will accomplish the effect intended, the product in all cases being entirely free from dust and dirt when using, and always ready for instant application without any preparation further than simply pouring water upon it.

Having thus described my invention, what I claim as new, and desire to secure by Letters Patent, is—

1. As a new and improved article of manufacture, a stove-polish in a granulated form, substantially as described.

2. As a new and improved article of manufacture, a stove-polish consisting of a mixture of plumbago and an adhesive substance, granulated and polished, substantially as described.

3. The method herein described of making stove-polish, consisting in first mixing plumbago with soap-stock; second, breaking and grinding the same while drying, and, third, in polishing the granulated article, all substantially as described.

CHARLES ZIMMERLING.

Witnesses:
JOHN A. WIEDERSHEIM,
A. P. GRANT.